Nov. 25, 1924.
T. W. WHIPPLE
GLARESHIELD
Filed April 8, 1924
1,517,137
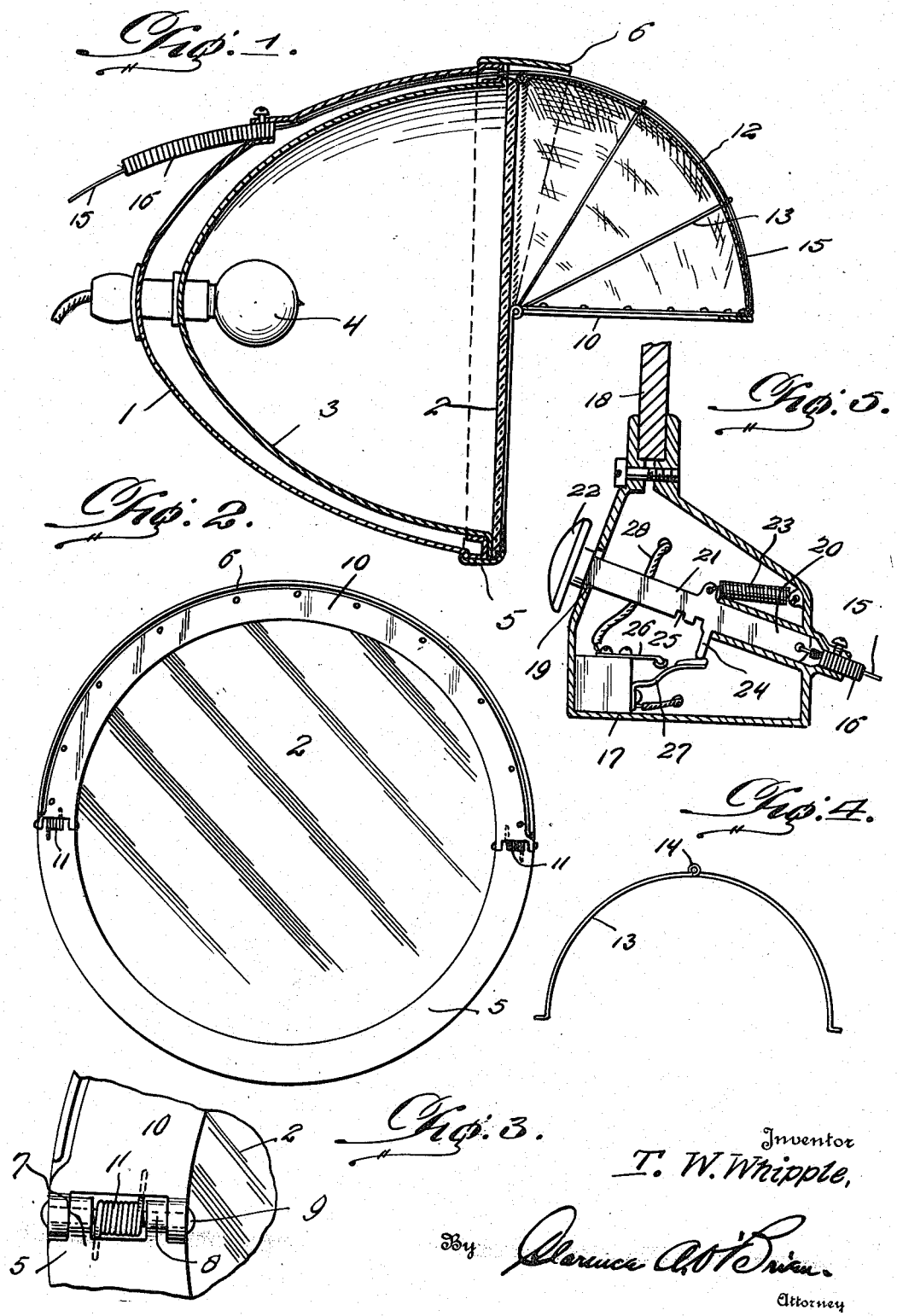
Inventor
T. W. Whipple,
By Clarence A. O'Brien
Attorney Patented Nov. 25, 1924.

1,517,137

UNITED STATES PATENT OFFICE.

TIMOTHY W. WHIPPLE, OF BONIFEY, FLORIDA.

GLARESHIELD.

Application filed April 8, 1924. Serial No. 705,028.

*To all whom it may concern:*

Be it known that I, TIMOTHY W. WHIPPLE, a citizen of the United States, residing at Bonifey, in the county of Holmes and State of Florida, have invented certain new and useful Improvements in Glareshields, of which the following is a specification.

This invention relates to glare shield structures adapted to be applied to the head lamps of automobile machines and it consists in the novel features hereinafter described and claimed.

An object of the invention is to provide for a head lamp used upon an automobile machine a glare shield having a flexible or foldable and extensible visor adapted to be extended in advance of and over the upper portion of the length of the lamp and which will effectually serve as means for preventing the glare of the lamp from dazzling the vision of the driver of an approaching machine, thus eliminating confusion and probably preventing accident in that the ultra violet rays from the illuminated lamp are intercepted in the line of vision of the operator of the approaching machine.

A further object of the invention is to provide an arrangement of the parts and features whereby the rays of light from the illuminated lamp may at all times be cast upon the roadway in the path over which the wheels of the machine are about to travel and thereby efficiently lighting the road notwithstanding the fact that the said objectionable rays or light are intercepted.

A further object of the invention is to provide in structure of the character stated, a shield including a foldable or collapsible visor member of especial design and having its parts and features so arranged and assembled that the said visor may be expeditiously extended or folded and when in a folded condition exposes the full area of the lens of the lamp upon the road and in the direction in which the machine moves forward.

A still further object of the invention is to provide in combination with a glare shield and the means for operating the same, means for automatically cutting out the illumination of the right hand lamp of the machine and at the time that the visor of the shield is extended in order that the left hand lamp is darkened when the machine to which the device is applied passes an approaching machine.

In the accompanying drawing:—

Figure 1 is a transverse sectional view of the glare shield showing the same applied to a lamp and with the visor extended, Figure 2 is a front elevation of the lamp with the shield applied and showing the visor folded or collapsed, Figure 3 is an enlarged detail view of a fragment of the glare shield, Figure 4 is a side elevation of a bow which is used upon the visor, Figure 5 is a transverse sectional view of means adapted to be manually manipulated for extending or folding the visor of the glare shield and which also shows means for making and breaking the electric circuit which leads to the right hand head light lamp of the automobile machine.

As illustrated in the accompanying drawing the lamp to which the glare shield is applied is of conventional form and includes a casing 1 closed at its forward end by a lens 2 and having a parabolic reflector 3 housed therein and at the focal point of which is located an electric bulb 4.

The glare shield comprises an annular ring 5 adapted to be slipped over the larger end of the lamp casing 1 and which circumscribes the lens 2. The ring 5 is provided around the upper half of the lamp casing with a forwardly extending hood flange 6. The ring 5 is provided with an inwardly disposed flange 7 which extends around the lower half of the lamp casing 1 and which is provided at its upper end with hinged knuckles 8, the said knuckles being alined with each other diametrically and horizontally transversely of the lamp casing 1. Hinged pins 9 are carried by the knuckles 8 and an arcuate strip 10 is hinged at its ends upon the pins 9 and beyond the sides of the knuckles 8 as best shown in Figure 3 of the drawings. Springs 11 are coiled about the intermediate portions of the pins 9 and the opposite ends of the springs bear against the end portions of the flanges 7 and the end portions of the strips 10 respectively, and as shown in said figure. The springs 11 are under tension with a tendency to hold the strip 10 disposed at a right angle to the flange 7 of the ring 5 as shown in Figure 1 of the drawing.

A visor member 12 of flexible material is secured at one edge to the inner surface of the ring 5 and at an angularly disposed edge with which it is provided to the strip 10. When the said visor is extended it is in the general shape of a section of a globe and its intermediate portions are held in such shape by means of bows 13 which are hinged at their ends to the ring 5 and which are disposed across the under surface of the visor 12. The bows 13 are provided at points between their ends with eyes 14 which extend through the visor 12 and which are alined with each other. A wire 15 is threaded through the alined eyes 14 and is secured at one end to the intermediate portion of the strip 10. From the upper portion of the visor 12 the said wire 15 is carried back through the lamp and between the reflector 3 and the side of the casing 1 and passes through a flexible tube 15 which is inserted in the top side of the casing 1.

A casing 17 is attached to a part 18 which is a portion of the body of the automobile machine to which the device is applied. The casing 17 is provided at its inner side with an opening 19 and at its opposite side with a guide 20. A bar 21 passes transversely through the casing 7 and is slidably received at one end portion of the guide and slidably received at its opposite end portion in the opening 19. A knob 22 is mounted upon the rear end of the bar 21 at a point beyond the rear side of the casing 17. The rear end of the wire 15 is connected with the forward end of the bar 21 as best shown in Figure 5 of the drawings. A coil spring 23 is connected at one end with the forward portion of the casing 17 and at its rear end with the intermediate portion of the bar 21 and is under tension with a tendency to normally hold the bar 21 in a forward position in the casing 17. The bar 21 is provided at its lower edge with a lug 24 which is adapted to have contact with the rear edge of the guide 20 whereby the forward movement of the bar 21 is limited. The bar 21 is provided at its lower edge with one or more notches 25 which are adapted to engage over the lower edge of the opening 19 when the bar 21 is moved into a retracted position with relation to the glare shield and whereby the said bar is held against the tension of the springs 23 until such time as the rear end of the bar is lifted so as to carry the edges of the notch 25 above the lower edge of the opening 19. At such time the tension of the spring 23 comes into play and the bar 21 is moved forwardly whereby the lug 24 is brought into engagement with the rear edge of the guide 20.

Terminals 26 and 27 are located in the casing 17 and these terminals are normally in contact with each other. The terminal 27 has an end portion located in the path of movement of the lug 24. The terminals 26 and 27 are connected with circuit wires 28 which lead to the right hand lamp of the automobile machine. When the bar 21 moves to the forward position as shown in Figure 5 of the drawing, the lug 24 encounters the free end portion of the terminal 27 and moves said terminal 27 out of contact with the terminal 26 thus interrupting the circuit over the wire 28. At such time the right hand lamp of the automobile is darkened while the left hand lamp may remain illuminated. The glare shield hereinbefore described is preferably applied to the left hand lamp of the automobile machine.

When the bar 21 is moved to the position as shown in Figure 5 of the drawing the tension of the springs 11 comes into play whereby the strip 10 is swung to the horizontal position as shown in Figure 1 and the visor 12 is extended over the upper portion of the lens 2 of the head light lamp. Thus the glaring rays from the said lamp are intercepted and the rays may pass under the lower edge of the visor 12 and direct upon the road in the path over which the machine is about to travel, but the upper rays of light from the lamp are cut off and dazzling glare in the eyes of an operator of an approaching machine is prevented.

When the bar 21 is moved rearwardly and one of the notches 25 is engaged over the lower edge of the opening 19, the strip 10 and the bow 13 is moved up under the hood flange 6 of the ring 5 and the visor member 12 folds under the said flange and thus the said parts are housed and protected under the said flange and the entire area of the lens 2 is exposed so that the rays of light from the reflector 3 and the bulb 4 may pass through the lens and project in advance of the lamp in the normally prescribed manner.

Having described my invention, what is claim is:—

1. A glare shield adapted to be used upon a lamp comprising a ring adapted to be applied to the lamp, said ring being provided at its upper portion with a forwardly extending hood flange, a spring pressed strip hingedly connected with the ring, a flexible visor connected with the ring and the strip, pivotally mounted bows interposed between the ring and the strip and a flexible element disposed transversely of the visor and threaded through the bows and the ring and connected with the strip.

2. A glare shield for a lamp comprising a ring adapted to be applied to the lamp, a spring pressed strip hingedly connected with the ring, a flexible visor connected with the ring and the strip, supporting bows for the visor pivotally connected with the ring and interposed between the ring and the strip and a flexible element connected at one end with the strip and trained through the bows and the ring.

3. A glare shield comprising a ring adapted to be applied to a lamp, a flexible visor connected to the ring, spring actuated means for extending the visor, a flexible element connected with the visor and adapted to collapse the same, a bar slidably mounted in a casing and connected with said flexible element, spring means for holding the bar at normal position, the bar being provided with a notch adjusted to engage an edge of the casing to hold the bar against the tension of the said spring, circuit closing contacts located in the casing, the said bar being provided with a lug and one of the circuit closing contacts having an end portion disposed in the path of movement of the said lug operating to break the circuit when said bar is actuated to bring the visor into operative position.

In testimony whereof I affix my signature.

TIMOTHY W. WHIPPLE.